(12) United States Patent
Laine et al.

(10) Patent No.: US 8,825,843 B2
(45) Date of Patent: Sep. 2, 2014

(54) SYSTEM AND METHODS FOR MONITORING A GEOGRAPHIC INFORMATION SYSTEM

(75) Inventors: Davin Peter Laine, Shasta Lake City, CA (US); Gregg Allen Lanzing, Oakland, FL (US)

(73) Assignee: Vestra Resources, Inc., Redding, CA (US)

( * ) Notice: Subject to any disclaimer, the term of this patent is extended or adjusted under 35 U.S.C. 154(b) by 476 days.

(21) Appl. No.: 13/196,731

(22) Filed: Aug. 2, 2011

(65) Prior Publication Data

US 2012/0066553 A1 Mar. 15, 2012

Related U.S. Application Data

(60) Provisional application No. 61/370,039, filed on Aug. 2, 2010.

(51) Int. Cl.
*G06F 15/173* (2006.01)
*H04M 11/04* (2006.01)

(52) U.S. Cl.
USPC .................. 709/224; 709/227; 455/404.2

(58) Field of Classification Search
USPC ........................ 709/224; 455/404.2
See application file for complete search history.

(56) References Cited

U.S. PATENT DOCUMENTS

| | | | | |
|---|---|---|---|---|
| 8,095,149 | B2 * | 1/2012 | Manson et al. | 455/456.1 |
| 8,447,266 | B2 * | 5/2013 | Smelov et al. | 455/404.2 |
| 8,489,669 | B2 * | 7/2013 | Johnson | 709/203 |
| 2008/0186165 | A1 * | 8/2008 | Bertagna et al. | 340/539.13 |

* cited by examiner

*Primary Examiner* — Ario Etienne
*Assistant Examiner* — Sahera Halim
(74) *Attorney, Agent, or Firm* — David R. Stevens; Stevens Law Group

(57) ABSTRACT

Disclosed are new approaches for monitoring an information system such as a GIS. For each service of a plurality of services provided by service computers, a periodic evaluation is performed by requesting performance of the selected test service routine by the service. If no valid response to the request is received within a response window the monitoring computer may produce an output indicating an error status for the service. The response window may be a time window or a maximum number of transmitted requests without a valid response. A monitoring computer may transmit requests to perform a service at a first period if an error indicator associated therewith is set and periodically at a second period if the error indicator associated therewith is not set. Requests to perform the service may not be transmitted during an exclusion time associated with a service or its corresponding service computer.

19 Claims, 9 Drawing Sheets ial Appli-
SYSTEM AND METHODS FOR MONITORING A GEOGRAPHIC INFORMATION SYSTEM

RELATED APPLICATIONS

This application claims priority to U.S. Provisional Application Ser. No. 61/370,039 filed Aug. 2, 2010 and entitled Monitoring Systems and Methods, which is hereby incorporated herein by reference in its entirety.

BACKGROUND

The invention is related to methods and apparatus for maintaining a distributed computing environment, such as a geographic information service (GIS) system.

A geographic information system (GIS) may be used to present, analyze, and manipulate geographically referenced data. GIS are becoming very popular as ways to manage and present information. A typical GIS may include many components. For example, the data to be geographically referenced may be gathered from systems that are geographically distributed. A separate system may provide maps and other cartographical information. Yet another system may store data once it has been referenced to geographic information or "geocoded." A web interface or other "front end" may access the geographically referenced data for presentation to a user or for analysis by an application.

The growing use of GIS creates new challenges related to the management of information, application programs, GIS servers, services, databases and related components within an organization. Improper operation of a single component or application in a GIS can cause problems throughout an organization relying on the proper operation of the GIS. For example, failure to properly collect data from a particular point in the GIS environment may result in the improper operation of other components or applications due to a lack of data.

In view of the foregoing, what is needed is a system and method for facilitating the monitoring and maintenance of a GIS and improving the overall reliability of a GIS.

DESCRIPTION OF THE DRAWINGS

The specific features, aspects and advantages of the present invention will become better understood with regard to the following description and accompanying drawings where.

DETAILED DESCRIPTION OF THE PREFERRED EMBODIMENT

Figure 1:
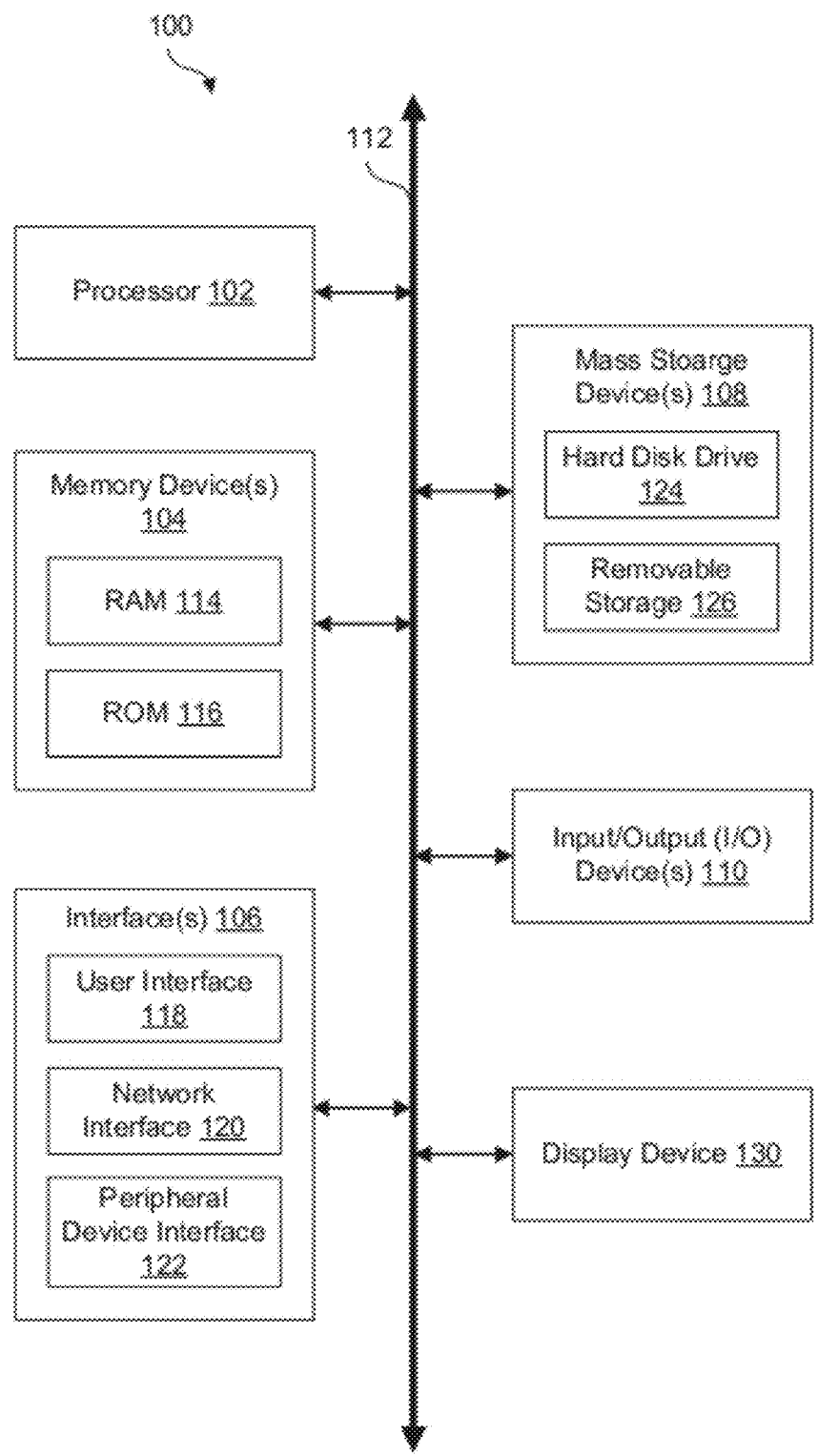
FIG. 1 is a schematic block diagram of a computer system.

In the following description of the preferred embodiment of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

In one embodiment, a method for monitoring a geographic information system may include, for each service of a plurality of geographic services provided by one or more service computers, periodically performing an evaluation. The evaluation may include selecting, by a monitoring computer, a geographic information test routine corresponding to the service and requesting performance of the selected geographic information test routine by the service. Communications from a service computer of the one or more service computers providing the service may then be monitored.

Information received from the service computer is evaluated with respect to an expected geographic information system content specification corresponding to the service. If one of no response is received within a response window and the information received does not conform to the expected geographic information system content specification, an output may be generated indicating that the service is down or otherwise non-responsive. The plurality of services may include, for example, a geocoding service and a map image service.

In some embodiments, each service has an error indicator associated therewith. In such embodiments, requesting, by the monitoring computer, performance of the selected geographic information test routine by the service may be performed at a first period if the error indicator associated therewith is set and periodically at a second period if the error indicator associated therewith is not set.

In some embodiments, a service of the plurality of services has a maximum request number associated therewith and the response window is the maximum request number associated with the service.

In some embodiments, the service is a primary service and has a dependent service associated therewith. In such embodiments, requesting, by the monitoring computer, performance of the selected geographic information test routine may include transmitting, by the monitoring computer, a first request for performance of the selected geographic test routine addressed to the primary service. If no valid response to the first request is received within the response window a second request for performance of the selected test service may be transmitted to the dependent service. Outputting, by the monitoring computer, an output indicating the error status for the primary service may be performed if no valid response to the second request is received during the response window.

In some embodiments, for each request a log record is recorded describing one of a response to the request and a lack of response to the request. A service may have a maximum number of requests associated therewith and recording the log record may include for first consecutive requests corresponding to the service for which one of no response and no valid response is received having a number up to or equal to the maximum number of requests, recording a log record having a verbose format. For second consecutive requests corresponding to the service and consecutive to the first consecutive requests and for which one of no response and no valid response is received, recording a log record may include recording a log record having an abbreviated format relative to the verbose format.

In some embodiments, the service has an exclusion time associated therewith. In such embodiments, the method may include refraining from requesting performance by the service of the selected geographic information test routine during the exclusion period. In some embodiments, the service computer of the one or more service computers providing the service has an exclusion period associated therewith. The method may therefore include refraining from requesting performance by the service of the selected geographic information test routine during the exclusion period.

In the following description, numerous specific details are set forth in order to provide a thorough understanding of the present invention. However, it will be apparent to one skilled in the art that the present invention can be practiced without these specific details. In other instances, well known circuits, components, algorithms, and processes have not been shown in detail or have been illustrated in schematic or block diagram form in order not to obscure the present invention in unnecessary detail. Additionally, for the most part, details concerning networks, interfaces, computing systems, and the like have been omitted inasmuch as such details are not considered necessary to obtain a complete understanding of the present invention and are considered to be within the understanding of persons of ordinary skill in the relevant art. It is further noted that, where feasible, all functions described herein may be performed in either hardware, software, firmware, digital components, or analog components or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to."

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
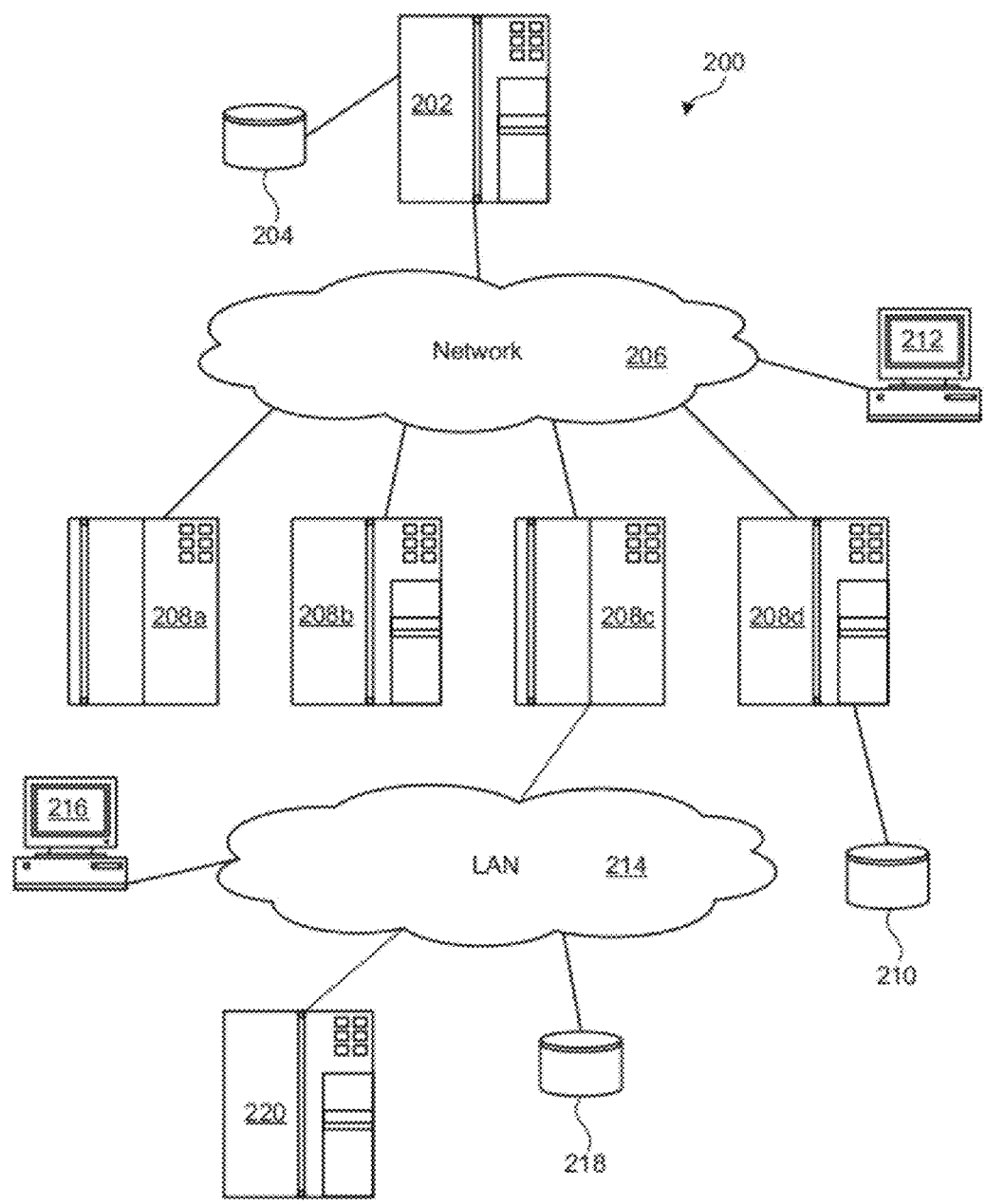
FIG. 2 is a schematic block diagram of a distributed computing environment.

FIG. 2 is a block diagram illustrating an example operating environment 200, including a monitoring server 202 operably coupled to a monitoring database 204. The monitoring server 202 and other components of the environment 200 may be embodied as the computing device 100 and include some or all of the components illustrated in FIG. 1. The database 204 may be a memory device, such as a hard drive, operably coupled to the monitoring server 202 or may be another computing device 100 communicatively coupled to the monitoring server 202. The monitoring server 202 may be coupled to a network 206 such as a LAN, WAN, or the Internet. One or more additional servers 208a-208d also be operably coupled to the network 206. The servers 208a-208d may form a geographic information system. Accordingly, the servers 208a-208d may function as one or more of web servers, file servers, spatial data base engines (SDE), internet map service (IMS) servers, geocoding servers, map image servers, database servers (e.g., SQL, MS-SQL, ORACLE, etc.), Microsoft Windows services servers, and the like. The servers 208a-208d may also provide other services including custom services programmed by an end user. In some embodiments, the monitoring server 202 may also provide one or more of the services listed above. One or more of the servers 208a-208d may be operably coupled to a database 210 to facilitate provision of one or more of the listed services.

One or more workstations 212 may be operably coupled to the monitoring server 202 or one or more of the servers 208a-208d, such as by means of the network 206. The workstation 212 may be used by a user wishing to access the services provided by the servers 208a-208d or monitoring server 202. The workstation 212 may host a browser for presenting a web-based interface to processes running on the servers 208a-208d or monitoring server 202.

One or more of the servers 208a-208d may be coupled to a local area network (LAN) 214 having one or more of additional workstations 216, databases 218, and servers 220. In such embodiments, the server 208c coupled to the LAN may provide a gateway to a system seeking to access resources provided on the workstation 216, database 218, or server 220. Accordingly, the services "provided" by the server 208c may include those provided components coupled to the LAN 214 and accessed by means of the server 208c.

Figure 3:
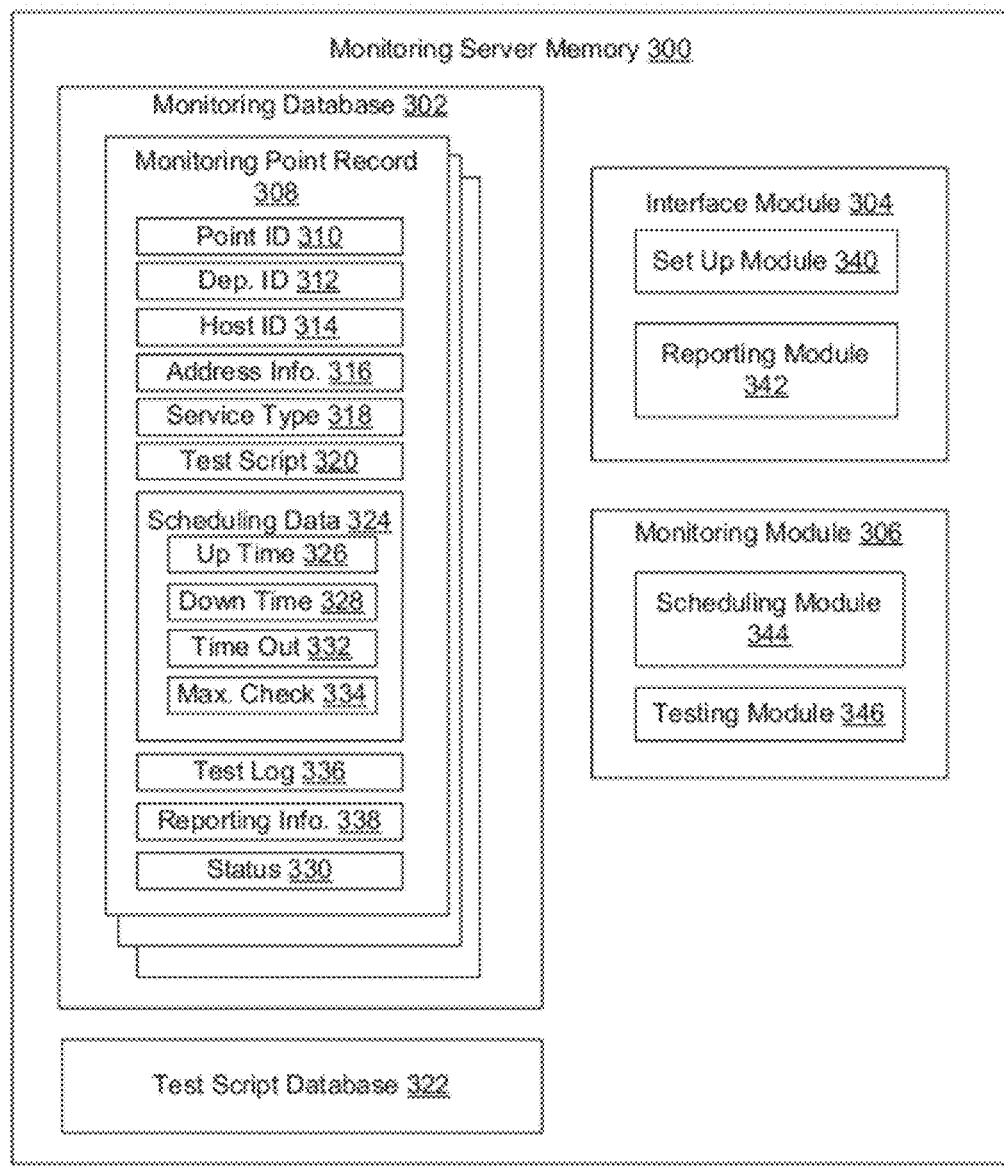
FIG. 3 is a schematic block diagram of software modules of a monitoring server in accordance with an embodiment of the present invention.

FIG. 3 illustrates a memory 300 of the monitoring server 202. The memory 300 may be embodied as a combination of one or more of the memory devices 104 and mass storage devices 108 of FIG. 1. The memory 300 may store a monitoring database 302, interface module 304, and monitoring module 306. The illustrated modules may include executable and operational data sufficient to perform the functionality described hereinbelow when processed by the monitoring server 202 in isolation or in the context of the operating environment 200.

The monitoring database 302 may include one or more monitoring point records 308. The monitoring point records 308 define services that are to be monitored by the monitoring module 306. The monitoring point records 308 may refer to a specific computer or to a specific application or instance of an application executed by a specific computer. A single computer, such as a server 208a-208d, may provide a plurality of services and have a corresponding plurality of monitoring point records 308 associated therewith in the monitoring database 302.

A monitoring point record 308 may define a point identifier 310 that is used to uniquely identify the point. The record 308 may further include a dependent point identifier 312. The dependent point identifier 312 may identify another record 308 that is a secondary or dependent point such that the service associated with a record 308 will be reported as down or otherwise unavailable only if both the point associated with the record 308 and the record 308 identified by the dependent point identifier 312 are both down or otherwise unavailable. Alternatively, the dependent point identifier 312 indicates an identifier of a monitoring point for which the monitoring point record 308 is a dependent or secondary point.

The record 308 may include a host identifier 314 identifying the computer system providing the service associated with the point record 308. The host identifier may include an IP address, DNS address, MAC address, or other identifier for the computer system executing the service associated with the record 308, such as one of the servers 208a-208d. The record 308 may further include address information 316. The address information 316 may include a port of the computer system identified by the host identifier 314 to which requests for access to the service associated with the record 308 should be addressed. The address information 316 may include other information and variables needed to address a service executing on the computing system identified by the host identifier, such as a file system path, file name, user name and password, and the like.

The record 308 may further include a service type 318. The service type 318 indicates what type of service is associated with the record 308. The service type may identify the service as a web server, file server, spatial data base engine (SDE), internet map service (IMS) server, geocoding server, map image server, database server (e.g., SQL, MS-SQL, ORACLE, etc.), Microsoft Windows services server, or some other common or custom computing service. The record 308 may include a test script 320. The test script 320 may be a pointer to a test script stored in a test script database 322. The test script may include instructions for generating a request for performance of the service associated with the record 308 and may include instructions for evaluating the validity of any response received. In some embodiments, the test script associated with a record 308 is automatically selected according to the service type 318 such that a test script 320 does not need to be explicitly defined. In some embodiments, if no test script 320 is specified in the record 308, then a default test script chosen according to the service type 318 is selected. The test script database 322 may include predefined scripts for known types of services. The test script database 322 may also include customizable scripts with variables and/or functions that may be modified by a user. The test script database may further include scripts that are associated with service types that are completely user defined. Such scripts may be entirely user generated or generated based on a template provided by a provider of monitoring software.

In some embodiments, the test script 320 stores variables needed to execute a test script stored in the test script database 322 for a specific instance of a service. For example, where the service type 318 indicates a geocoding service, the test script 320 may include a name of the geocode service on the host server executing the service, a "gcAddress" for the case of an AGS (ArcGIS Server), and possibly a folder name where the service is stored on a host server Where the service type 318 indicates an image service representational state transfer (REST), the test script 320 may include a name of a Rest image service on an AGS server and possibly a folder name where the service is stored on a host server. The test script 320 may further define a ServiceBbox variable if scale dependency is used within the map service and no image is returned until a user zooms in to the map image. The test script 320 may also include a layer identifier.

Where the service type 318 indicates an image service (IMS) web service description language (WSDL) service, the test script 320 may include the name of a map service and possibly a folder where the map service is stored on a host server. Where the service type 318 indicates an internet map service (IMS), the test script 320 may include the name of the IMS on executing on a host server. The service type 318 may also be a Web Map Service (WMS).

Where the service type 318 indicates a spatial database engine (SDE), the test script 320 may define a user identifier and password for accessing the functionality of the SDE. Where the service type 318 indicates an SDE layer, such as an ESRI SDE layer, the test script 320 may define a name of an SDE database and an SDE layer name in addition to a user name and password.

Where the service type 318 indicates a database, such as an Oracle or MS SQL database, the test script 320 may include an identifier of a port and listener used to connect to the database. The test script 320 may further define a user identifier and password for accessing the database and a table within the database on which a check is to be performed. Where the service type 318 indicates a web server or web application, the test script 320 may define a complete uniform resource locator (URL) for the web site or web application. Where the service type 318 indicates an RSS (really simple syndication) feed, the test script 320 may include a complete URL of the RSS feed. Where the service type 318 indicates a WINDOWS service, the test script 320 may define a name of the service to check such as may be output from a Microsoft Management Console. Where the service type 318 indicates a custom service or task, the test script 320 may define a log file for checking the status of the service and a path for accessing the log file. Additional variables unique to the custom service or task may also be defined by the test script 320.

A monitoring point record 308 may further include scheduling data 324 for instructing the monitoring module 306 when to evaluate a status of the service associated with a monitoring point record 308. The scheduling data 324 may define a period at which evaluations are to be performed and times at which evaluations are not to be performed. For example, if the host providing the service associated with the monitoring point record 308 is scheduled to be offline for routine maintenance, the scheduling data may indicate that evaluations of the service are not to be performed during this period. In some embodiments, the scheduling data 324 defines an up time interval 326 and a down time interval 328. The up time interval 326 may define the time between evaluations when a status indicator 330 of the record 308 indicates that the service associated with the record 308 is up and responding properly. The down time interval 328 may be longer or shorter than the up time interval 326 and may define the time between evaluations when the status indicator 330 of the record 308 indicates that the service associated with the record 38 is down or otherwise not responding properly.

The scheduling data 324 may further define a timeout time 332 indicating a time period after a request to perform the service at which the service associated with the record 308 will be deemed to be down or non-responsive if no response or no valid response is received. Deeming a service to be down or non-responsive may be performed by setting the status indicator 330 to so indicate. The scheduling data 324 may further define a maximum number of requests 334 describing the maximum number of requests to perform a test service that will be performed during one evaluation of a service's performance if no response or no valid response is received to any of the previous requests made during the evaluation. If the maximum number of requests 334 are transmitted to a service during one evaluation then the service associated with the record 308 may be deemed down or non-responsive by setting the status indicator 330 to so indicate. Alternatively, the maximum number of requests 334 may indicate the number of evaluations indicating that a service is down that must be received before the status indicator 330 will be changed to indicate that the service associated with the monitoring point record 308 is down or otherwise non-responsive.

The monitoring point record 308 may further define a test log 336 for storing the result of individual requests to perform the service associated with the point record 308. The test log 336 may be stored in a separate database in some embodiments. The test log 336 may store a result of each and every evaluation of a service associated with a monitoring point record 308 or some subset of results. In some embodiments, the test log stores an abbreviated record for results of evaluations indicating the a service is up or otherwise functional. The test log may store a longer or more verbose type of record or results of evaluations indicating that a service is down or otherwise non-responsive. In some embodiments, up to M verbose records are generated for M consecutive evaluations indicating that a service is down, after which the abbreviated record will be stored in the test log 336 for subsequent evaluations, even if the result of the evaluation indicates that the service is down or otherwise not responsive. In some embodiments, M is equal to the maximum number of requests 334.

The abbreviated type of record may store such information as a time and date of an evaluation and an indicator of the outcome. The verbose type of record may contain this information plus additional information for debugging purposes. In some embodiments, where a user specifies that the monitoring module 306 is to operate in a debugging mode, the verbose type of record is generated for all results of evaluations indicating that a service is down or otherwise non-responsive.

The monitoring point record 308 may define reporting information defining how the status of the service associated with the monitoring point record 308 is to be reported. The reporting information may include a phone number, email address, or a file name to which error messages are transmitted or written to upon detection. In some embodiments, the reporting information may indicate that reports are to be transmitted to a user at regularly scheduled intervals, e.g. daily, providing the status of a service or server providing the service.

The monitoring point records 308 may be grouped by host identifiers 314 such that all monitoring point records 308 associated with services provided by the same host server may be reviewed and edited together. In some embodiments, a server record may be created and define some or all of the fields described hereinabove as belonging to a monitoring point record 308 and monitoring point records 308 may be associated therewith to define data specific to services performed by the server associated with the server record.

Some information defined by the monitoring point record 308 may be input with respect to a specific host, such as the host identifier, and then individual monitoring point records 308 corresponding to the specific host may then be defined. In instances where the server associated with a group of monitoring point records is to be offline or otherwise unavailable due to routinely scheduled maintenance, the monitoring point records 308 may include common scheduling data 324 indicating that the services associated with the monitoring point records are not to be performed during this server maintenance, thus avoiding unnecessary error messages. Alternatively, this scheduling information may be stored in a server record corresponding to a server and with which the monitoring records 308 corresponding to services performed by the server are then associated.

The interface module 304 may include a set up module 340 and a reporting module 342. The set up module 340 may provide an interface for generating monitoring point records 308 either individually or in groups associated with a same server 208a-208d. The interface module 304 may enable a user to specify some or all of the fields described hereinabove as belonging to a monitoring point record 308. In some embodiments, some or all of the fields of the monitoring point record 308 may be supplied as default values or specified default values in view of user supplied for another field of the monitoring point record 308. For example, for a specified service type 318 one or more values for the fields of the monitoring point record 308 may be automatically selected to be appropriate for the specified service type 318. The interface module 304 may provide a web interface to a workstation 212, 216, smart phone, or other interface executing a browser.

The reporting module 342 may be invoked by the monitoring module 306 to present data relating to the status of the services associated with the monitoring point records 308. The data presented may include whether the service is up, down, disabled, or some other status indicator. The data presented by the reporting module 342 may correspond to the status indicator 330.

The reporting module 342 may further transmit information relating to the service associated with the monitoring point record 308 to another computer, such as a workstation 212, 216, smart phone, or other phone. The reported information may be in the form of an email, web page, text message or the like. The manner of reporting the information may be as specified in the reporting information 338 associated with a monitoring point record 308. Alternatively, a monitoring module 304 may have reporting information associated therewith that is used to address reporting information by means of electronic messages to a client program, a web page, email, text message, voice mail, or the like.

The monitoring module 306 may include a scheduling module 344 and a testing module 346. The scheduling module 344 may perform evaluations of services associated monitoring point records according to the scheduling data 324 and/or scheduling data associated with a monitoring module 306. For example, a monitoring module 306 may have an exclusion time associated therewith during which maintenance is performed or the monitoring module 306 is otherwise not available. Accordingly, the scheduling module 344 may refrain from performing evaluations during this exclusion time.

The scheduling module 344 may perform evaluations according to the scheduling data 324 of an individual monitoring point record 308. For example, the scheduling module 344 may prompt the testing module 346 to perform evaluations of a service associated with a monitoring record 308 with a frequency specified by the up time interval 326 if the status indicator 330 indicates that the service is up and at a frequency specified by the down time interval 328 if the status indicator 330 indicates that the service is down. The scheduling module 344 may refrain from prompting the testing module 346 to perform an evaluation of the service associated with a monitoring point record 308 if the scheduling data 324 indicates that the current time is within an exclusion period for the service or a server providing the service. The scheduling module 344 may also schedule regular, e.g., daily, reports of the status of one or more services associated with one or more monitoring point records 308.

The testing module 346 may perform evaluations of services associated with each monitoring point record as prompted by the scheduling module 344. Testing of a service associated with a monitoring point record may include executing a test script using information from one or both of a test script field 320 of the monitoring point record 308 and a script from the test script database 322 corresponding to the service type 318 of the monitoring point record 308. The test script from the test script database 322 and/or test script field 320 may be operable to format a request for the service associated with monitoring record 308 to fulfill. The test script may further include functionality to evaluate the validity of any response received and the timing of any response. For example, the test script, or a separate test script, may be operable to detect whether a valid response has been received within a timeout period 332 associated with the service. Evaluating whether a response is valid may include evaluating whether the application-level content of a response contains valid information. This may include evaluating whether the application-level content of the response has the proper form or formatting for the service type 318. This may additionally or alternatively include evaluating the accuracy of the information received.

Figure 4:
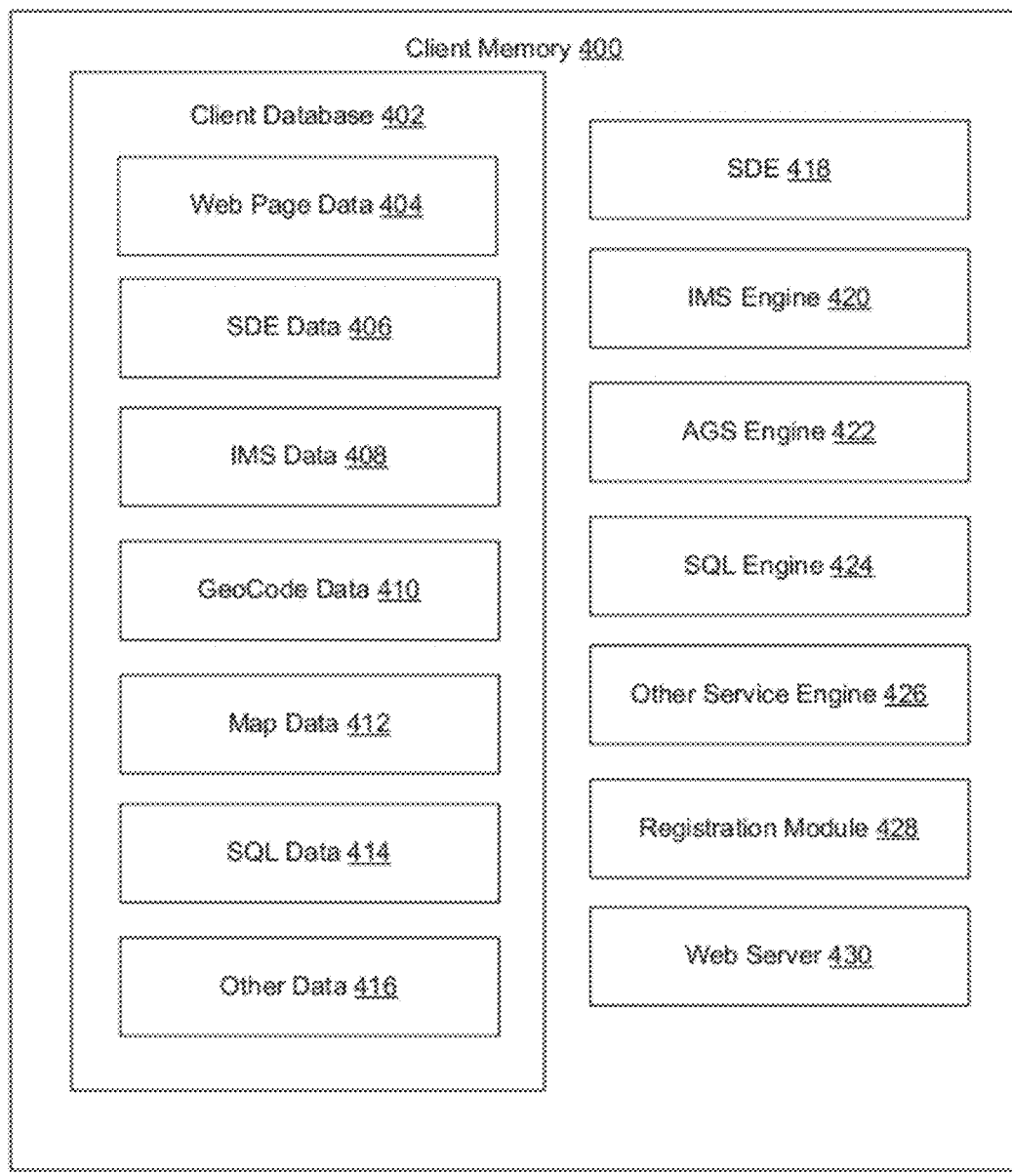
FIG. 4 is a schematic block diagram of software modules of a monitored server in accordance with an embodiment of the present invention.

FIG. 4 illustrates an example of a client memory 400 of a server 208a-208d providing a service associated with one or more of the monitoring point records 308. The memory 400 may be embodied as a combination of one or more of the memory devices 104 and mass storage devices 108 of FIG. 1. The memory 400 may include a client database 402. The client database 402 may include one or more types of data for supporting one or more components of an information system, such as a GIS. The components may include SDE, AGS, GeoCode, Map, REST, or other GIS services provided by ESRI. Accordingly, the client database 402 may include web page data 404 for providing web based access to an information system, such as a GIS. Other data may include SDE data 406, IMS data 408, GeoCode data 410, and map data 412. The client database 402 may also include a general purpose data such as SQL formatted data 414, or some other type of database data 416, such as real simple syndication (RSS) data. The data 416 may relate to user defined services.

The client memory 400 may further host modules programmed to perform functions associated with an information system, such as a GIS. For example, the client memory 400 may host a spatial database engine (SDE) 418, internet map service (IMS) 420, an ArcGIS (AGS) engine 422, SQL engine 424, and/or other service engines 426. The service engines 426 may include user defined applications. The client memory 400 may further host a registration module 428 programmed to transmit information regarding which services are provided by the server 208a-208d hosting the client memory 400 and information necessary to access them to a monitoring server 202. Upon receipt of this information, the set up module 340 hosted by the monitoring server 202 may use the information to create one or more monitoring records 308 associated with the services reported by the registration module 428 and populate the fields with the information provided regarding the services. In some embodiments, a web server 420 may also be hosted in the client memory 400 for providing web page data 404 and to provide a web interface to one or more of the other services provided by the server, such as an RSS feed.

Figure 5:
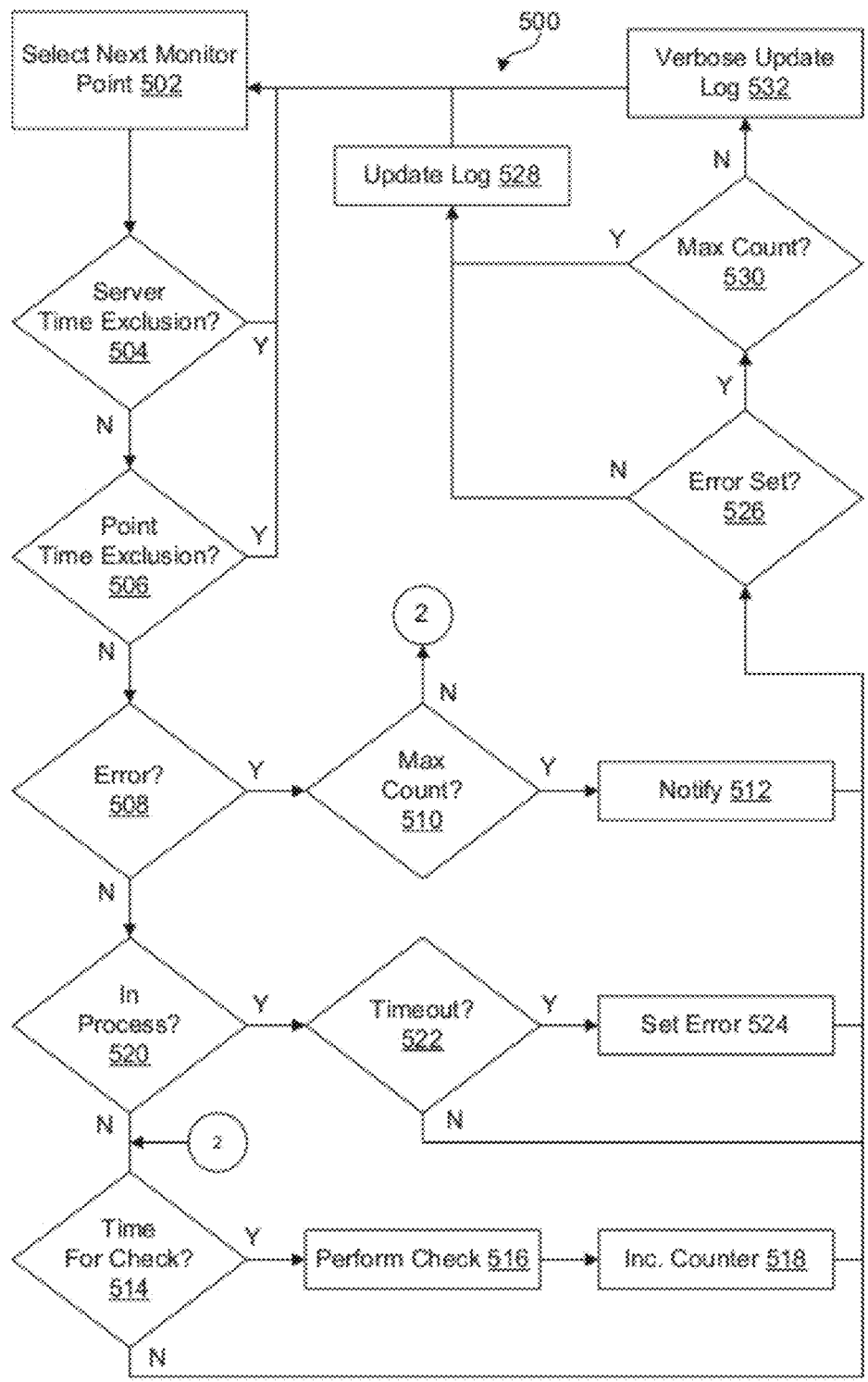
FIG. 5 is a process flow diagram of a method for monitoring a service in accordance with an embodiment of the present invention.

FIG. 5 illustrates 500 a method for monitoring an information system, such as a GIS. The method may include selecting 502 a service, such as by selecting a monitoring point record 308 from the monitoring point database 302 for evaluation. The method 500 may then evaluate 504 whether the current time is within an exclusion period for the server identified by the monitoring point record 308. If so, then the process returns to the selection 502 of another monitoring point record 308. If not, then the method 500 may include evaluating 506 whether the current time is within an exclusion period of the monitoring point record 308. If not, then the process returns to the selection 502 of another monitoring point record 308.

If so, then the method 508 may evaluate communications received in response to a previously transmitted request to perform the service associated with the monitoring point record. The previously transmitted request may have been transmitted by executing one or both of the test script information 320 and a test script from the test script database 322 corresponding to the service type 318 of the monitoring point record 308. If a communication corresponding to the monitoring point record 308 has been received and found 508 to be in error, then the method 500 may include evaluating 510 whether the communication found to be in error in addition to previously and consecutively received erroneous communications exceeds a maximum number of requests 334 for the monitoring point record 308.

If so, then notification 512 is performed. Notification 512 may include transmitting an error message using the information and proscribed method of the reporting information 338 of the monitoring point record 308. Notification 512 may further include changing the status 330 of the monitoring point record 308 to indicate that the service associated therewith is not responding properly or is down.

If a maximum number of requests is not found 510 to be exceeded, then the method may include evaluating 514 whether it is time for another evaluation of the service associated with the monitoring point record 308. This may include evaluating the up time interval 326, down time interval 328, and the status 330, and a time of a previous evaluation to determine if the time passed since the previous evaluation is greater than the up time interval 326 if the status 330 indicates the service is up or greater than the down time interval 328 if the status 330 indicates the service is down.

If an evaluation is found 514 to be due, then an evaluation may be performed 516, such as by executing one or both of a test script 320 and a test script from the test script database 322 corresponding to the service type 318 of the monitoring point record 308. A counter indicating the number of evaluations performed may then be incremented 518 and processing may proceed to the selection 502 of another monitoring point record 308.

In some embodiments, a record or log of each test may be generated. For example, the method 500 may include evaluating 526 whether an error indicator has been set. If not, then the log for the monitoring point record 308 may be updated 528 using an abbreviated record format. If so, then the method 500 may evaluate 520 whether the maximum number of checks has been exceeded, e.g., the maximum consecutive number of evaluations indicating that the service associated with a monitoring point record 308 has been met or exceeded. If so, then the log for the monitoring point record 308 may be updated 528 using an abbreviated record format. If not, then the log may be updated 532 using a verbose record type, as discussed hereinabove.

If an evaluation 508 of communications from a service associated with the monitoring point record 308 indicates that no erroneous response has been received, the method 500 may include evaluating 520 whether a previously transmitted request to perform a service associated with the monitoring point record 308 is still in process. If so, then the delay from a time of transmission of the request may be evaluated 522 with respect to the timeout period 332. If the timeout period is found 522 to have passed, then the status 330 may be set 524 to indicate that the service associated with the monitoring point record 308 is down or otherwise non-responsive and processing may continue with the selection 502 of another monitoring point record 308 or updating of a log as described above with respect to steps 526-532. Notification may also be sent according to the reporting information 338. If the timeout period is not found 522 to have expired, then, processing may continue at the evaluation 514 of whether time for another evaluation has arrived.

Figure 6:
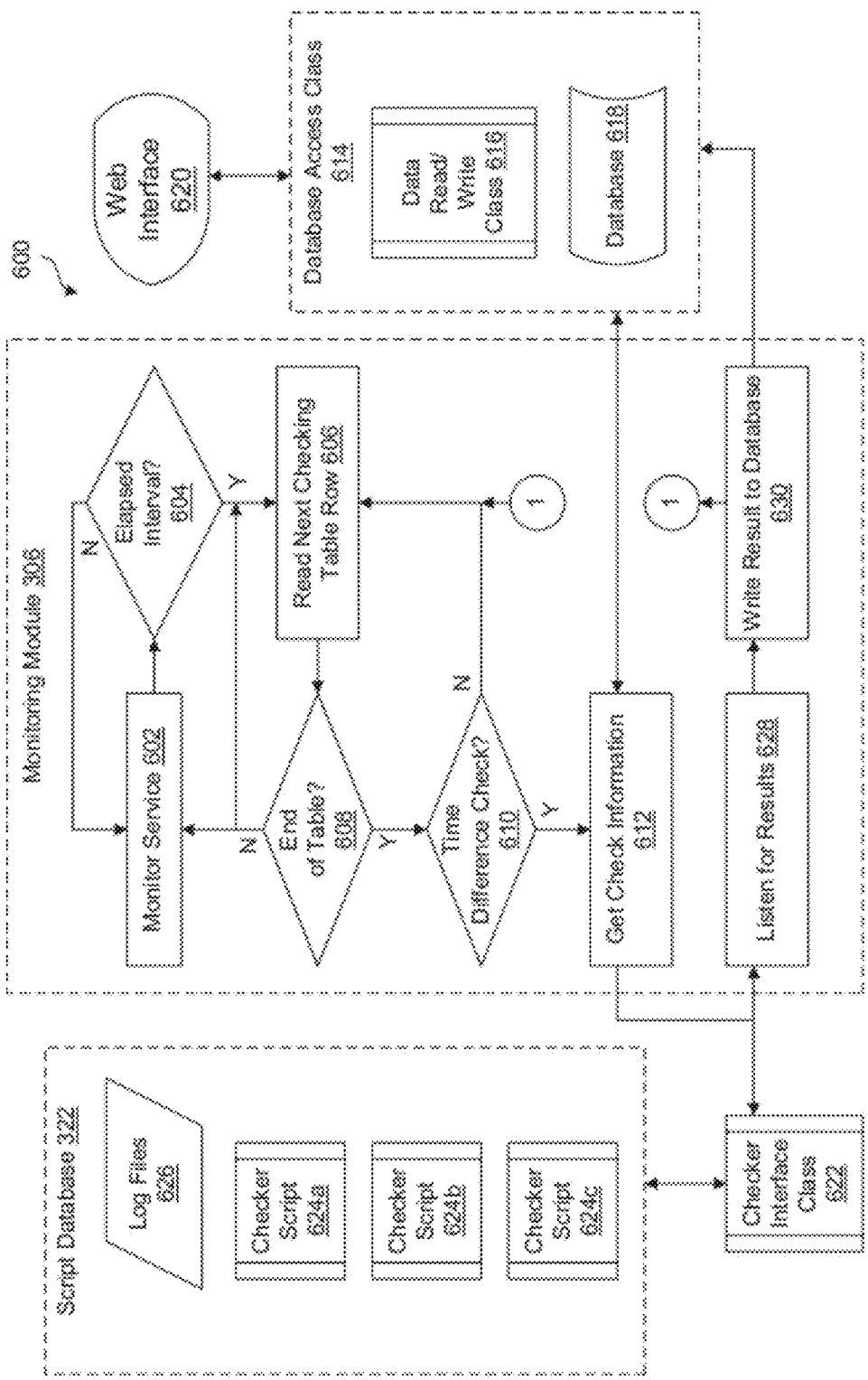
FIG. 6 is a process flow diagram of another method for monitoring a service in accordance with an embodiment of the present invention.

FIG. 6 illustrates a method 600 for monitoring an information system such as a GIS. The method 600 may include monitoring 602 a service, such as a service associated with a monitoring point record 308. Monitoring 602 may include generating a request to perform the service, transmitting the request to the service, and evaluating communication from the service to determine if any reply or a valid reply is received. The elapsed interval that the service has been monitored 602 may be evaluated 604. If the elapsed interval is found 604 to exceed a predefined time, such as the timeout period 332 for the service being monitored, or some other predefined interval, then the next row in a checking table may be read 606 and then monitored 602, if it exists. The checking table may be a table of all services to be monitored, such as a list of some or all of the monitoring point records 308. If the last monitored 602 service, is found 608 to be the last element in the checking table, then the method 600 may include evaluating 610 whether an evaluation based on a time difference is needed. If so, then information needed to perform the time difference check may be retrieved 612 using a database access class 614, including read/write classes 616, to access a database 618. The database 618 may store the result of previous tests, including for example, the result of an immediately preceding test. A user may use a web interface 620 executed by, for example, a workstation 212, 216 may be used by an operator to access information within the database 618.

The information needed to perform the time difference check may also be obtained using a checker interface class 622 to interface with one or more scripts 624a-624c and one or more log files 626. The scripts 624a-624c may be scripts suitable for performing evaluations of a service, such as were described hereinabove as being stored as test scripts 320 or in the test script database 322. The log files 626 may store the results of previous evaluations or responses from previous communications with the services to be monitored. Data from a previous communication from the database 618 or log files 626 and/or information from the monitoring step 602 may be provided to the checker interface class 622, which may evaluate the data using an appropriate script 624a-624c. Alternatively, the results retrieved 612 and the result of the monitoring 602 of a service may be evaluated by the monitoring module 306 to obtain data dependent on a time difference between checking performed during the monitoring step 602 and a previous instance of the monitoring step 602 for the same service or server. The method 600 may include listening 628 for results from the checker interface class 622 in response to the retrieval 612 of check information. The result of the time-difference check may then be written 630 to the database 618.

Figure 7:
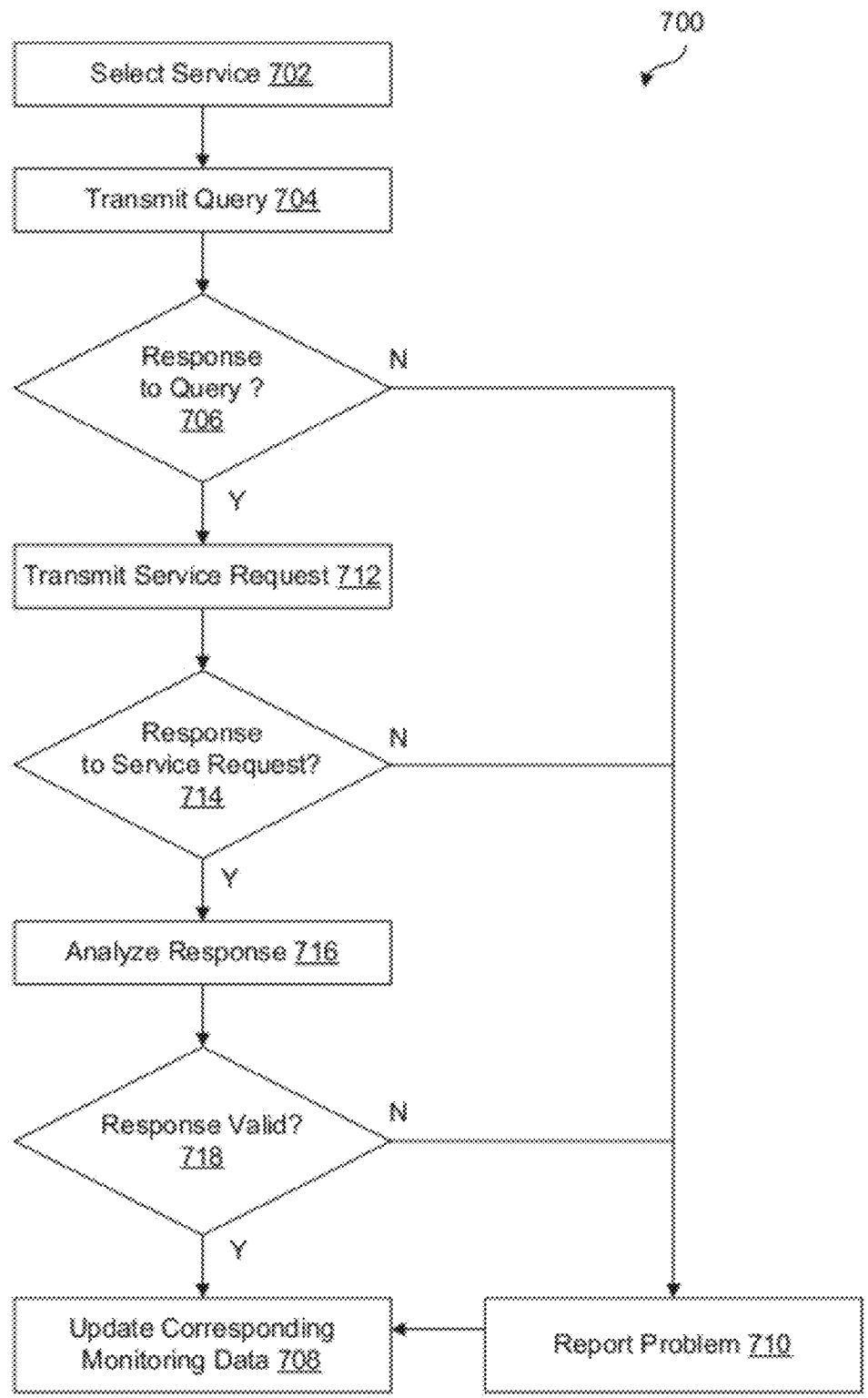
FIG. 7 is a process flow diagram of a method for evaluating a status of a service in accordance with an embodiment of the present invention.

Referring to FIG. 7, a method 700 for evaluating a service, such as a service associated with a monitoring point record 308 may include selecting 702 a service, such as by selecting a monitoring point record 308 from the monitoring database 302. A query may be transmitted 704 to the host server identified by the host providing the service to be monitored, such as the host identified by the host identifier 314. Communication from the host may then be evaluated 706 to determine if a response has been received. If not, then monitoring data may be updated 708 to indicate that the host was non-responsive. In some embodiments, the problem may be reported 710, such as discussed hereinabove using the reporting information 338 associated with the service under test. If a response to the query is found 706 to be received, then a request to perform the service is transmitted 712 to the service, such as by transmitting a message to the server executing the service. Communication from the host may then be evaluated 714 to determine if a response is received. If no response is found 714 to be received during a response window, such as one or both of a timeout period a transmission of a maximum number of requests, then monitoring information 708 may be updated to indicate that the service is non-responsive. A report that the service is non-responsive may also be reported 710 as discussed hereinabove.

If a response is found 714 to be received, then the response may be analyzed 716. If the response is found 718 to be valid, then the monitoring data may be updated 708 to indicate that the service is up or otherwise performing as expected. If not, then the monitoring data may be updated 708 to indicate that the service is down or otherwise not functioning properly and a report may be transmitted 714.

Figure 8:
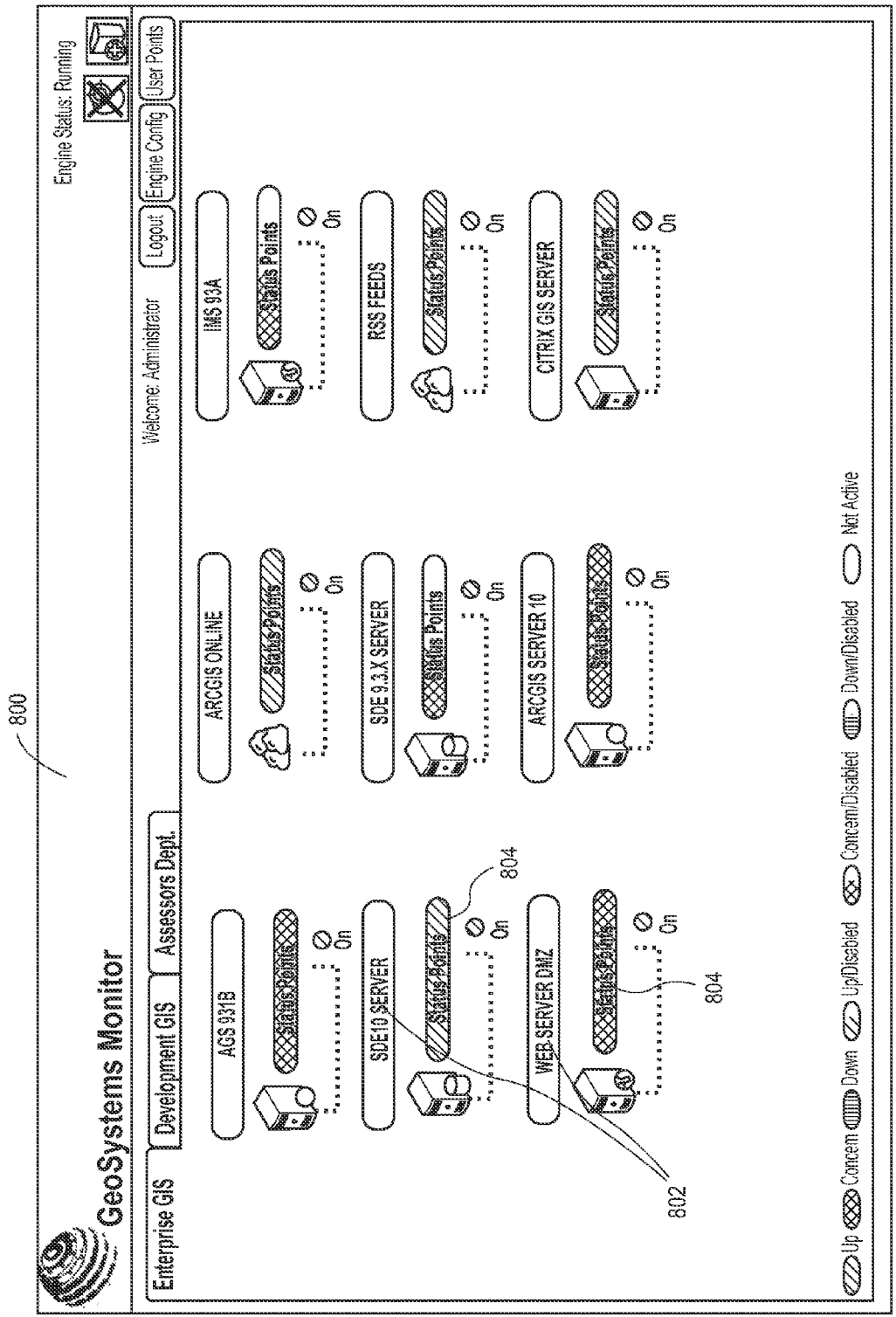
FIG. 8 is an illustration of an interface to a monitoring module in accordance with an embodiment of the present invention.

FIG. 8 illustrates an example of a web or local interface 800 to reporting information for a plurality of servers having monitoring point records 308 associated therewith. The interface 800 may include a plurality of server identifiers 802 each having a status indicator 804 associated therewith. The status indicator 804 may include one or both of a graphical symbol, color code, test, or the like. The status indicator 804 may reflect one or both of the status of the server associated with a monitoring point record 308 and the status of an individual monitoring record 308 associated with the server identified by the server identifier.

In some embodiments, a user may click or otherwise select a server identifier 802 to obtain additional information regarding individual services provided by the serer. For example, interaction with the server identifier 802 may prompt a web interface 720 to display a table such as shown in Table 1. The description column may include an identifier associated with a service, such as a service having a corresponding monitoring point record 308. The description column may report the point identifier for a monitoring point record 308. The status column may reflect the value stored in the status field 330 of the monitoring point record 308. The error column may report the nature of the error causing a service to be down, such as a timeout error or exceeding of the maximum number of checks in the maximum number of requests field 334.

TABLE 1

Monitoring Point Report

| Description | Status | Error | Last Check |
|---|---|---|---|
| Service1 | Up | N/A | 05/21/2011 4:21 pm |
| Service2 | Up | N/A | |
| Service3 | Down | Time Out | |

Figure 9:
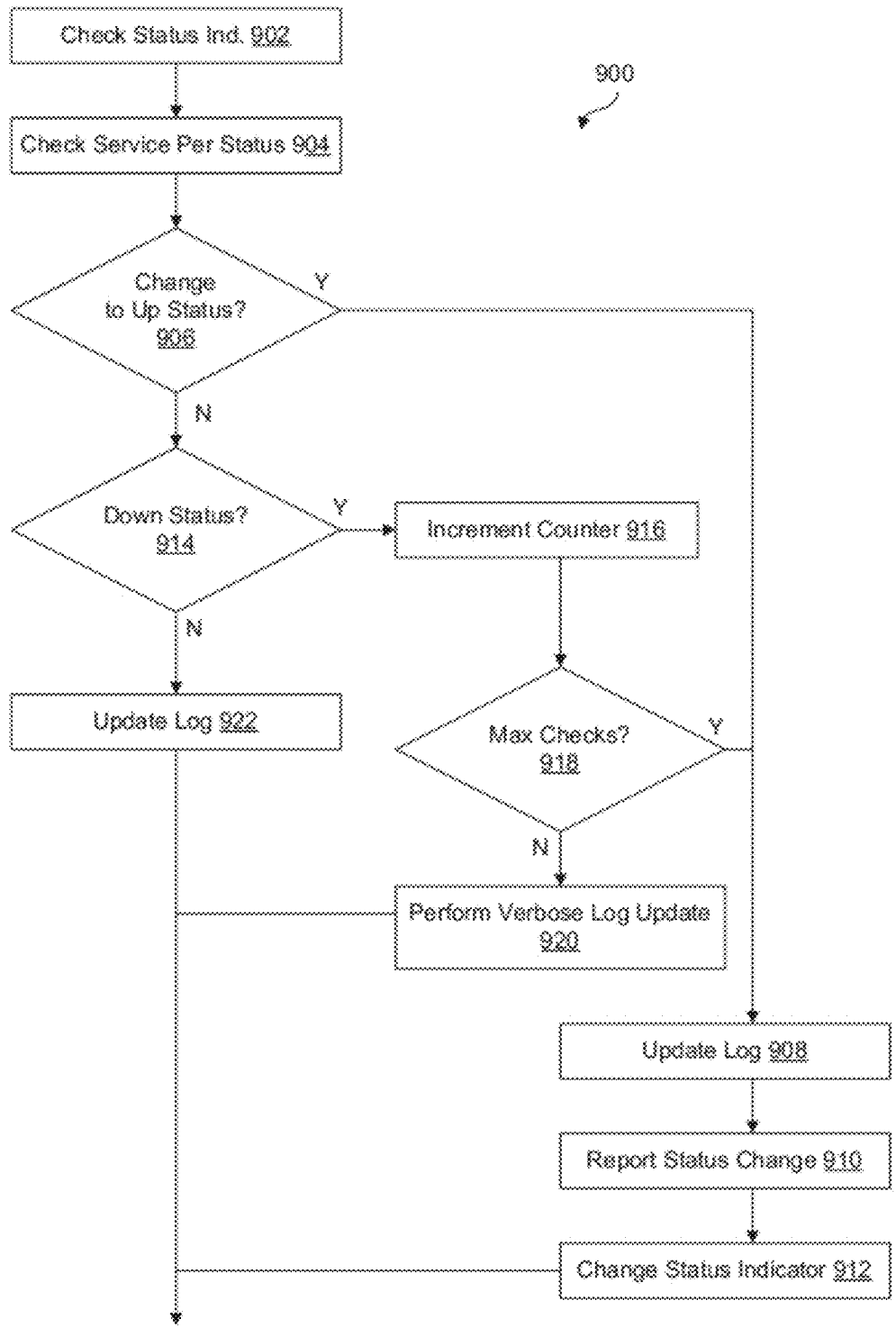
FIG. 9 is a process flow diagram of a method for reporting a status of a service in accordance with an embodiment of the present invention.

FIG. 9 illustrates a method 900 for recording results of evaluations. The method 900 may include checking 902 the status indicator 330 for a monitoring point record 308 and then evaluating 904 the service associated with the monitoring point record 308 as described hereinabove in accordance with the value stored in the status indicator 330. If the status indicator 330 of the monitoring point record 308 indicates that it is in down, or otherwise non-responsive, than the evaluation 904 may be performed at a period indicated by the up time interval 326, otherwise the evaluation 904 may be performed at a period indicated by the down time interval 328.

The outcome of the evaluation 904 may be evaluated 906 to determine if the status indicator 330 of the monitoring point record 308 will change as a result of the evaluation as described hereinabove. For example, a change may be found 906 if the service indicator 330 previously indicated that a service was down but the status indicator 330 previously indicated the service was down. If so, then a log for the monitoring point record 308 may be updated 908, the change in status may be reported 910 to a user as described hereinabove, and value stored in the status indicator 330 may be updated to reflect the detected change in status. Updating 908 may include making an abbreviated record type as described hereinabove.

If a change in status is not found, then the method 900 may include evaluating 914 whether the result of the check 904 indicates that the service is down or otherwise non-responsive. If so, the a counter is incremented 916. The counter may record the number of consecutive checks 904 that have a result indicating that the service is down or otherwise non-responsive. The value stored in the counter may then be evaluated 918 with respect to a maximum number of checks, such as the maximum number of requests 334 for the service. If the value in the counter is equal to, or in some embodiments greater than, the maximum number of checks, then steps 908-912 may be performed. Otherwise, a log for the service may be updated 920 using a verbose record as described hereinabove. If the result of the evaluation 904 is found 914 not to indicate that the service is down or otherwise non-responsive, than a log may be updated 922, such as by creating an abbreviated record as described hereinabove.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet-related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention, this is used for transitive and non-transitive storage. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state during transitive and non-transitive storage. The invention is not limited to any particular type of memory device, or any commonly used protocol for storing and retrieving information to and from these memory devices, respectively.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Finally, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

What is claimed is:

1. A method for monitoring a geographic information system, the method comprising:
    for each service of a plurality of geographic services provided by one or more service computers, periodically performing:
        selecting, by a monitoring computer, a geographic information test routine corresponding to the service;
        requesting, by the monitoring computer, performance of the selected geographic information test routine by the service;
        monitoring, by the monitoring computer, communications from a service computer of the one or more service computers providing the service;
        evaluating, by the monitoring computer, information in any response to the request received from the service computer of the one or more service computers providing the service with respect to an expected geographic information system content specification corresponding to the service;
        if one of no response and no valid response to the request is received within a response window and the information in any response to the request does not conform to the expected geographic information system content specification, outputting, by the monitoring computer, an output indicating an error status for the service;
    for each request, recording a log record describing one of responses to the request and a lack of response to the request;
    wherein each service has a maximum number of requests associated therewith; and
    wherein recording the log record further comprises, for each service:
        for first consecutive requests corresponding to the service for which the one of no response and no valid response is received having a number up to or equal to the maximum number of requests, recording a log record having a verbose format; and
        for second consecutive requests corresponding to the service and consecutive to the first consecutive requests corresponding to the service for which the one of no responses and no valid response is received, recording a log record having an abbreviated format relative to the verbose format.

2. The method of claim 1, wherein the response window is a time window.

3. The method of claim 1, wherein each service has an error indicator associated therewith; and
    wherein requesting, by the monitoring computer, performance of the selected geographic information test routine by the service is performed periodically at a first period if the error indicator associated therewith is set and is performed periodically at a second period if the error indicator associated therewith is not set.

4. The method of claim 1,
    wherein the response window is the maximum request number associated with the service.

5. The method of claim 1, wherein the service is a primary service and has a dependent service associated therewith; and
    wherein requesting, by the monitoring computer, performance of the geographic information test routine comprises:
        transmitting, by the monitoring computer, a first request for performance of the selected test service routine addressed to the primary service;
        if no valid response to the first request is received within the response window, transmitting, by the monitoring computer, a second request for performance of the selected test service addressed to the dependent service; and
    wherein outputting, by the monitoring computer, an output indicating the error status for the primary service is performed if no valid response to the second request is received during the response window.

6. The method of claim 1, wherein the plurality of services include at least one of a geocoding service and a map image service.

7. The method of claim 1, wherein the service has an exclusion time associated therewith, the method further comprising refraining from requesting performance by the service of the selected geographic information test routine during the exclusion period.

8. The method of claim 1, wherein the service computer of the one or more service computers providing the service has an exclusion period associated therewith, the method further comprising refraining from requesting performance by the service of the selected geographic information test routine during the exclusion period.

9. The method of claim 1, wherein outputting, by the monitoring computer, the output indicating the error status for the service comprises outputting a graphical indicator to a display.

10. The method of claim 1, wherein outputting, by the monitoring computer, the output indicating the error status for the service comprises transmitting a text message.

11. A system for monitoring a geographic information system comprising:
one or more processors;
memory coupled with the one or more processors;
a monitor point database defining a plurality of addressable points each having a service for providing geographically referenced data associated therewith; and
a monitoring module programmed, for each point of the monitor point database, to periodically:
select a test service routine corresponding to the service associated with the point, the test service routine programmed to request a geographically referenced response from the point;
request performance of the selected test service routine by the point;
monitor communications from the point; and
if one of no response and no valid response to the request is received within a response window and a response is received that does not conform to an expected geographic information content specification corresponding the point, produce an output indicating an error status for the point;
for each request, recording a log record describing one of responses to the request and a lack of response to the request;
wherein each service has a maximum number of requests associated therewith; and
wherein recording the log record further comprises, for each service:
for first consecutive requests corresponding to the service for which the one of no response and no valid response is received having a number up to or equal to the maximum number of requests, recording a log record having a verbose format; and
for second consecutive requests corresponding to the service and consecutive to the first consecutive requests corresponding to the service for which the one of no responses and no valid response is received, recording a log record having an abbreviated format relative to the verbose format.

12. The system of claim 11, wherein the response window is a time window.

13. The system of claim 11, wherein each point has an error indicator associated therewith in the monitor point database; and
wherein the monitoring module is further programmed to request performance of the selected test service routine by the point periodically at a first period if the error indicator associated therewith is set and periodically at a second period if the error indicator associated therewith is not set.

14. The system of claim 11, wherein the response window is a maximum request number associated with each point; and
wherein the monitoring module is further programmed to produce the output indicating the error status for the point when the point fails to provide information corresponding to the expected geographic information specification in response to a number of consecutive requests to perform the test service routine equal to the maximum request number.

15. The system of claim 11, wherein at least one of the plurality of addressable points is a primary point and at least one of the plurality of addressable points is a dependent point associated with the at least one primary point; and
wherein the monitoring module is further configured, for each of the at least one primary points, to:
transmit a first request for performance of the selected test service routine to the primary point;
if no valid response to the first request is received within the response window, transmit a second request for performance of the selected test service to the dependent point associated with the primary point; and
produce an output indicating an error status for the primary point if no valid response to the second request is received during the response window.

16. The system of claim 11, wherein the plurality of points include applications executing on one or more service computers.

17. The system of claim 11, wherein the GIS services include one or more of a geocoding service and a map image service.

18. The system of claim 11, wherein at least one point of the plurality of points has an exclusion period associated therewith, the monitoring module is further programmed to refrain from requesting performance of the selected test routine by the at least one point during the exclusion period associated therewith.

19. A computer program product for monitoring a geographic information system, the computer program product comprising a non-transitory computer-readable storage medium having computer-usable program code embodied therein, the computer-usable program code comprising:
computer-usable program code to, for each service of a plurality of geographic services provided by one or more service computers, periodically:
select a geographic information test routine corresponding to the service;
request performance of the selected geographic information test routine by the service;
monitor communications from a service computer of the one or more service computers providing the service;
evaluate information in any response to the request received from the service computer of the one or more service computers providing the service with respect to an expected geographic information system content specification corresponding to the service;
if one of no response and no valid response to the request is received within a response window and the information in any response to the request does not conform to the expected geographic information system content specification, produce an output indicating an error status for the service;
for each request, recording a log record describing one of responses to the request and a lack of response to the request;
wherein each service has a maximum number of requests associated therewith; and wherein recording the log record further comprises, for each service:
  for first consecutive requests corresponding to the service for which the one of no response and no valid response is received having a number up to or equal to the maximum number of requests, recording a log record having a verbose format; and
  for second consecutive requests corresponding to the service and consecutive to the first consecutive requests corresponding to the service for which the one of no responses and no valid response is received, recording a log record having an abbreviated format relative to the verbose format.

* * * * *